Jan. 18, 1966     J. AMATO     3,229,646
LONG GOODS MACHINE
Filed Sept. 23, 1960     8 Sheets-Sheet 1
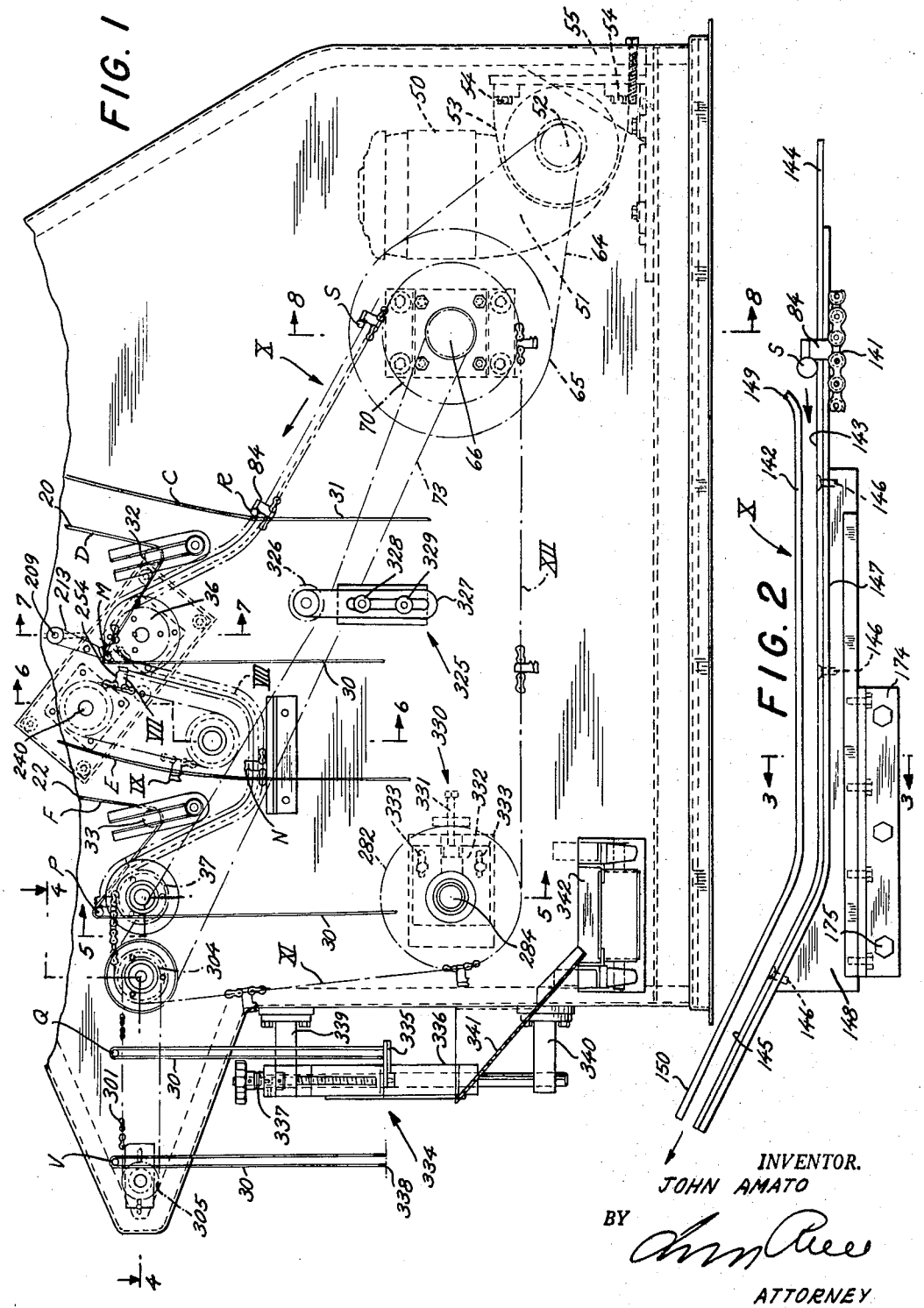
INVENTOR.
JOHN AMATO
BY
ATTORNEY Jan. 18, 1966 J. AMATO 3,229,646
LONG GOODS MACHINE
Filed Sept. 23, 1960 8 Sheets-Sheet 2
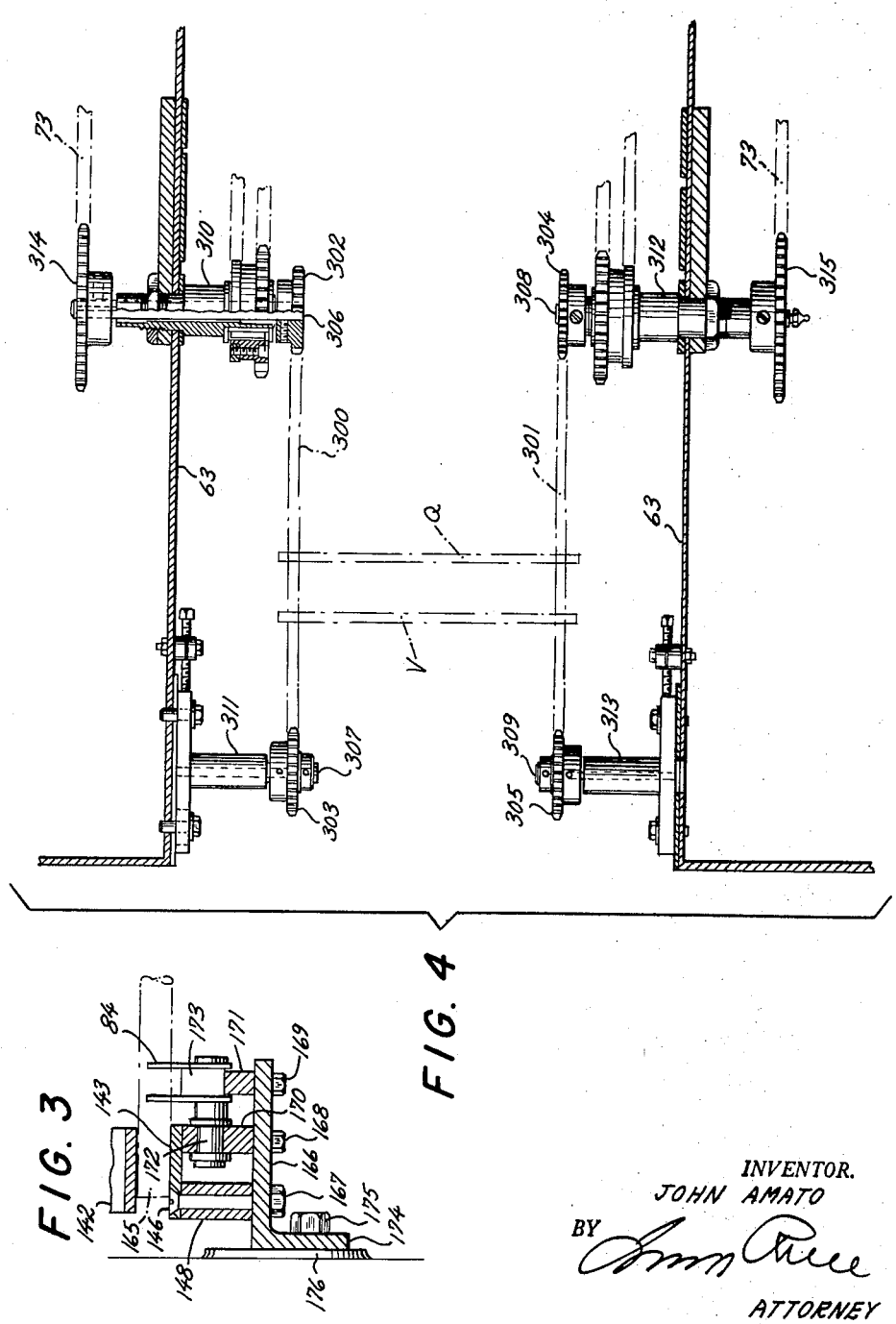
INVENTOR.
JOHN AMATO
BY
ATTORNEY Jan. 18, 1966 J. AMATO 3,229,646
LONG GOODS MACHINE
Filed Sept. 23, 1960 8 Sheets-Sheet 3

INVENTOR.
JOHN AMATO
BY
ATTORNEY

Jan. 18, 1966 J. AMATO 3,229,646
LONG GOODS MACHINE
Filed Sept. 23, 1960 8 Sheets-Sheet 4

INVENTOR.
JOHN AMATO
BY
ATTORNEY

Jan. 18, 1966      J. AMATO      3,229,646
LONG GOODS MACHINE
Filed Sept. 23, 1960      8 Sheets-Sheet 5
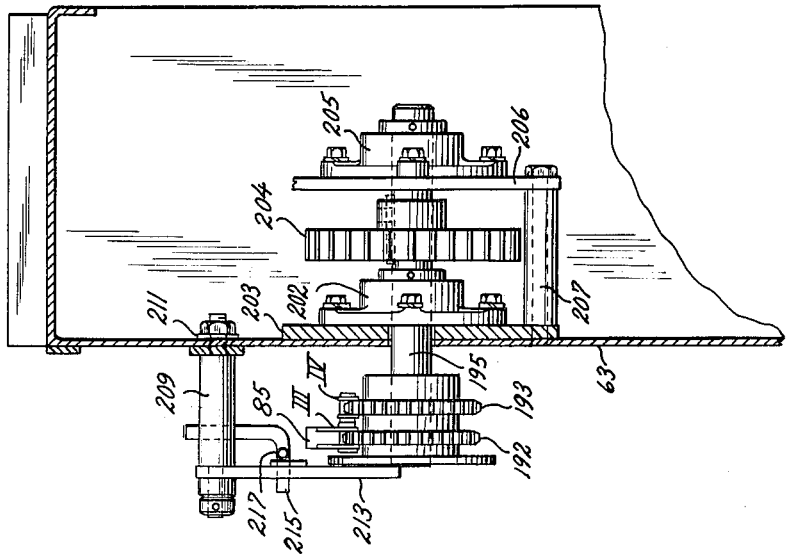
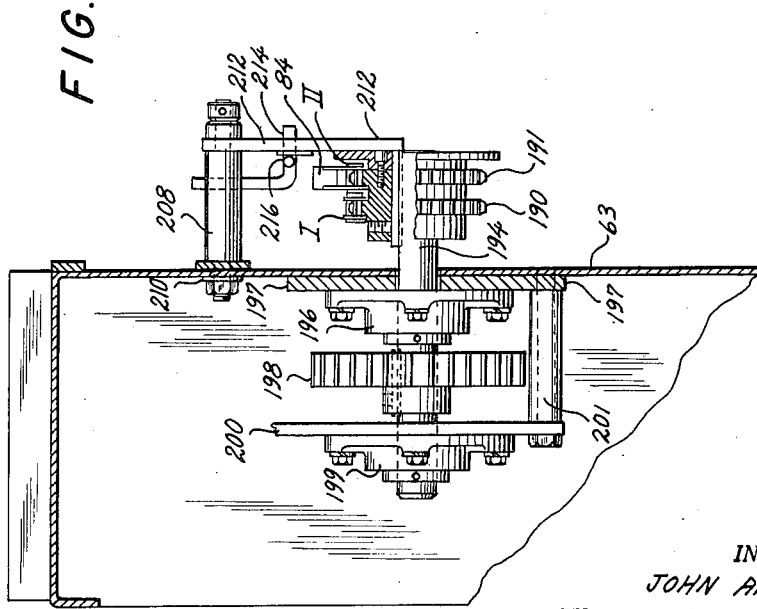
FIG. 7
INVENTOR.
JOHN AMATO
BY
ATTORNEY

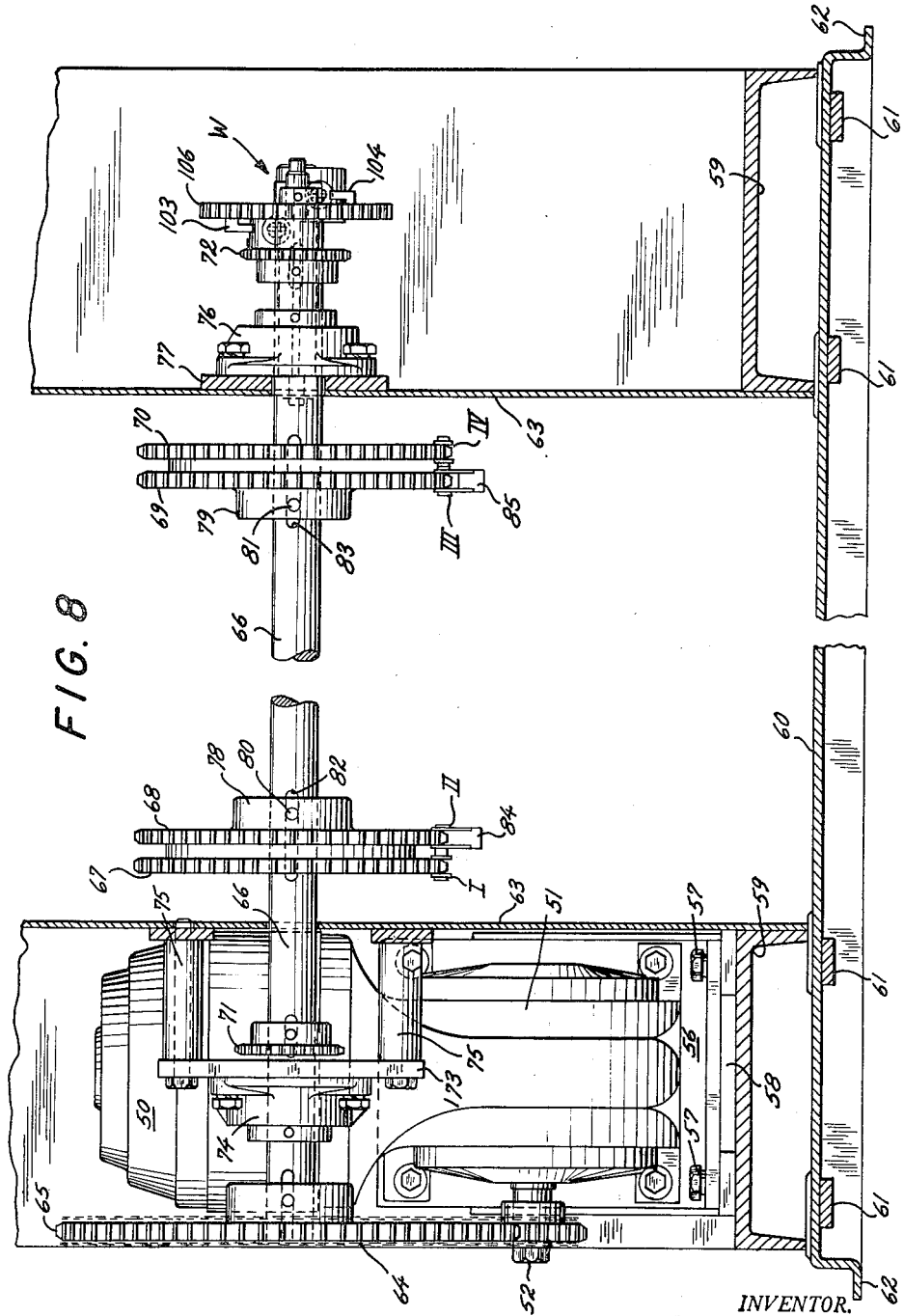

INVENTOR.
JOHN AMATO
ATTORNEY

Jan. 18, 1966  J. AMATO  3,229,646
LONG GOODS MACHINE
Filed Sept. 23, 1960  8 Sheets-Sheet 8

INVENTOR.
JOHN AMATO
BY
ATTORNEY

United States Patent Office 3,229,646
Patented Jan. 18, 1966

3,229,646
LONG GOODS MACHINE
John Amato, Brooklyn, N.Y., assignor to Clermont Machine Co. Inc., Brooklyn, N.Y., a corporation of New York
Filed Sept. 23, 1960, Ser. No. 58,017
5 Claims. (Cl. 107—14)

The present invention relates to a long goods machine, and it particularly relates to a device for handling extruded spaghetti or macaroni.

According to the present invention, the spaghetti and macaroni is first extruded and then picked up by sticks so that there will be uniform lengths of spaghetti or macaroni on such sticks and then the sticks will be passed to a drying apparatus after they have been processed so that the spaghetti or macaroni thereon will have even lengths.

It is among the objects of the present inventon to provide an automatic machine of the character above described which will feed the sticks and at the same time carry the sticks across the extruded material so as to permit a uniform take-up by the sticks during such feeding operation.

Another object is to provide a novel high capacity stick carrier pick-up machine for long goods machines in which the sticks will be uniformly fed onto a conveyor and with assurance that uniform pick-up will be had by the sticks as they are carried by the conveyor.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to the present invention to provide a stick feed machine in which the sticks are fed onto a conveyor chain at uniform intervals of about six seconds for each stick with about 15″ between the sticks, with the sticks automatically picking up predetermined lengths of extruded material so that such extruded material will be held thereon in inverted U-shaped lengths with a minimum of cutting and evenness resulting.

It has been found most satisfactory to achieve uniform results if the sticks are caused to pass under elongated extrusion heads arranged in parallel and in pairs.

Each of these heads should substantially continuously extrude the material to be picked up and provided with cut-offs so synchronized to the stick picking up as a result in uniform lengths.

This operation can be carried out at a relatively high rate of production and without stoppage of the machine.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characaters denote corresponding parts throughout the several views:

FIG. 1 is a diagrammatic side elevational view of the conveyor mechanism showing the location of the sticks in respect to the extruded material and how it is utilized to pick up the extruded material.

FIG. 2 is a diagrammatic side elevational view of the first portion of the track upon an enlarged scale as compared to FIG. 1 showing the manner in which the sticks are initially carried by the track.

FIG. 3 is a transverse sectional vertical view upon the line 3—3 of FIG. 2 upon an enlarged scale as compared to FIG. 2.

FIG. 4 is a horizontal sectional view taken upon the line 4—4 of FIG. 1 and upon an enlarged scale as compared to FIG. 1 showing the track driving mechanism at the outlet side of the machine.

FIG. 7 is a transverse sectional view taken upon the line 7—7 of FIG. 1 upon an enlarged scale as compared to FIG. 1, showing an intermediate portion of the chain conveyor arrangement.

FIG. 8 is a transverse sectional view taken upon the line 8—8 of FIG. 1 showing the motor drive arrangement upon an enlarged scale as compared to FIG. 1.

Referring to FIGS. 9 to 13, there are shown the two parallel expression heads A and B to which the plastic dough is fed and from which the rows of extruded material depend.

Figure 9:
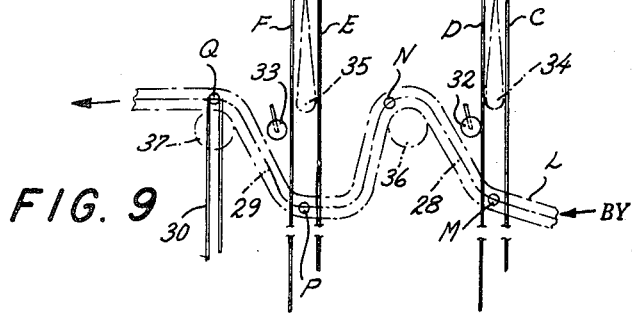

The extruded material in FIG. 9 may be formed on each side of the die, and it is indicated at C and D for the die or expression head A, and E and F for the die or expression head B.

Referring to FIG. 9, the knives for cutting off the extruded material are indicated on each side of the expression heads A and B, G and H for the head A and J and K for the head B.

The chain is indicated diagrammatically by the dot and dash lines L, and it is shown as carrying the sticks M, N, P and Q.

It will be noted that the stick M is between the extruded strands C and D and that the stick P is between the extruded strands E and F, and that neither of the knives G, H, J and K have cut off the strands C, D, E and F.

Figure 10:
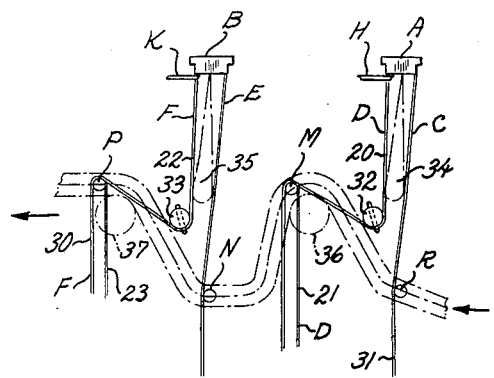
FIGS. 9, 10, 11, 12 and 13 are respectively diagrammatic side arrangement views illustrating the feed of the sticks as well as the take-up of the extruded material in successive positions, upon a relatively small scale as compared to FIGS. 1 to 8.

In the next position illustrated in FIG. 10, the stick

M will have moved to a position to the left and will be picking up the strands D which are being cut off by the knife H, while the stick P has been also moved to the left to an elevated position where it has picked up the strands F which are being cut off by the knife K.

At the same time a new stick R is presented to and is about to take up the extruded strands C, while the stick N has also been moved down to the left so it will commence to take up the strands E.

Figure 11:
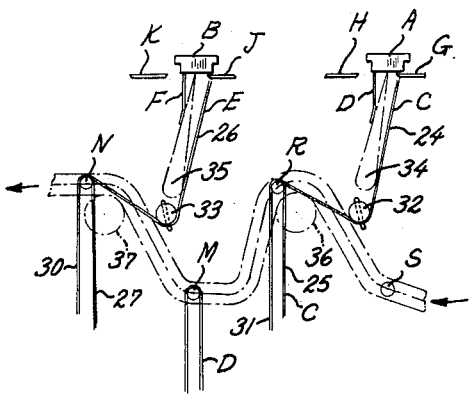

In FIG. 11, the knives H and K will have been withdrawn, and the strands D and F will again be started after the cut-offs which took place in FIG. 10.

In FIG. 11, the sticks R and N will be taking up the strands C and E respectively which are cut off by the knives G and J.

The stick M in FIG. 11, which is carrying the severed strands D, will pass under the extrusion head B without picking off any additional material.

Figure 12:
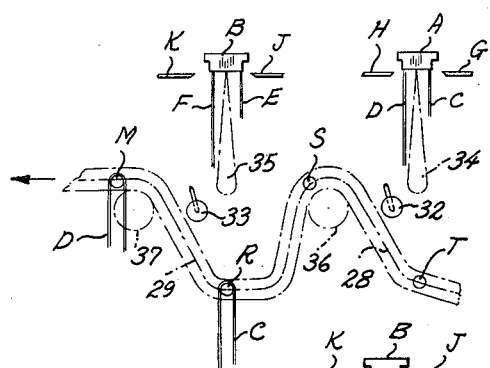

In FIG. 12, there is shown the sticks R and M passing to the left with the severed strands C and D thereon, while additional strands are being formed at C, D, E and F from the extrusion heads A and B.

It will also be noted that new sticks S and T are being moved into position.

Figure 13:
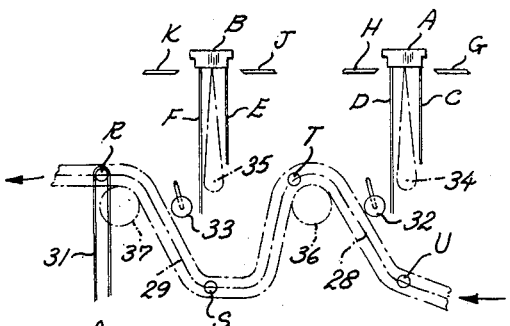

In FIG. 13, chain L will stand still with the stick R in position until the strands C, D, E and F have been extruded to their full length as indicated in FIG. 9 with the new sticks S and T being in position beneath the strands C and D, and E and F respectively.

In this operation, there may be a spacing of about 15″ between each stick with an interval of about six seconds wherein chain L is advanced through this distance, and with an extrusion rate of about 4½″ of dough for every six seconds.

The extrusion will always be longer on the side at D and F, and the extrusion will normally take place so that there will be about twelve seconds of extrusion on the side at D and F as compared to eighteen seconds of extrusion at C and E.

Normally, there will be a continuous movement of the sticks for twenty-four seconds and a pause for thirty-six seconds in the position of FIG. 13 until the proper lengths of C and D, and E and F are achieved in FIG. 9.

In FIG. 10, end portions 20 and 22 of strands D and F are shown in the positions 21 and 23 they will be in when they are being cut off and depending from their sticks.

The same is also true in FIG. 11 with the ends 24 and 26 of strands C and E which are at positions 25 and 27 after severance.

It is noted in FIG. 9 that the sticks M and P will be presented to the center or mid-length of the extruded strands D and F which may have a total length of about 18″ so that 9″ will hang down on each side of the finished sticks indicated at R and Q in FIGS. 9 and 13.

The sticks by moving upwardly and to the left as indicated at 28 and 29 in FIG. 9 will pick up the forward portions indicated at 30 and 31 in FIGS. 10 and 11, while the portions still attached to the dies will be drawn under the guide members 32 and 33 until the cut-off takes place by the knives G or H, or J or K.

The right-hand strands C and E will still be in the process of being elongated after the strands D and F have been cut off so that they will always be of shorter length as indicated in FIGS. 9 and 13 during the period that the left-hand strands D and F are being picked up by the sticks M and P of FIG. 9.

As a result, each stick in the position of the sticks Q, M, and R of FIGS. 9, 12 and 13 will have the approximately same length of loops or inverted U's of extruded material when they are passed to the left beyond the positions Q, M and R of FIGS. 9, 12 and 13 respectively.

The first swinging separator member 34 will be positioned below the head A between the strands C and D, while the second separator member 35 will be positioned below the head B between the strands E and F.

These members will be in vertical position at the stages of the operation indicated at FIGS. 9, 12 and 13.

They will swing to the left in the positions indicated in FIGS. 10 and 11.

The main chain guides are indicated at 36 and 37, and they guide the chain so that it moves up to the left carrying the sticks up in this direction when they are taking up the extruded strands C, D, E and F.

To summarize the operation, the sticks M and P in FIG. 9 and U and S in FIG. 13 will be held in position directly below the heads A and B until the extrusion of the strands C and D, and E and F is completed with the sticks M and P in FIG. 9 and with the sticks U and S in FIG. 13 being directly between the extruded strands.

This will take place between the pause period of thirty-six seconds.

Then, the sticks M and P in FIG. 9 and the sticks U and S in FIG. 13 will start to take up the left-hand strands D and F as indicated in FIG. 10 with the left-hand portions 30 being already in full length and with the right-hand portions 22 being drawn under the guide members 33 as they are being cut off by the knife K in FIG. 10.

This same cut-off operation will take place with the cut-off knife H in FIG. 10 so that the strands 20 will fall into the position 21 as they are being drawn under the guide 32.

At the same time the succeeding sticks N and R in FIG. 10 are being presented to the substantially completely extruded strands C and E.

By this time the stick P has been moved to the left from the position shown in FIG. 10, and the stick M has been moved from the elevated position in FIG. 10 to the lower position in FIG. 11.

Then the operation of FIG. 11 follows as the sticks N and R are being moved to the left with the strands 24 and 26 being cut off by the knives G and J and with the strands falling into position as indicated at 25 and 27 during the leftward movement.

Finally, when the left stick R has reached the position as shown in FIG. 13, a pause or rest period of thirty-six seconds will take place until there is a full extrusion of the strands C and D, and E and F, when the cycle will re-start from the position as indicated in FIG. 9.

Referring particularly to FIG. 1, there is shown in small scale the machine in the position of FIG. 10.

It will be noted that the strands C and E are about to be taken up by the sticks R and N whereas the sticks M and P have already been presented to the strands D and F and are drawing them under the guide members 32 and 33.

The ends 30 will be hanging free while the ends 20 and 22 are about to be cut off.

A new stick S is shown in position at the right of FIG. 1 while the sticks which already acquired their full pick-up are indicated at Q and V at the upper left of FIG. 1.

The chain is shown as moving upwardly to the left over the sprocket or drive wheel 36 and then down and again upwardly to the left over the sprocket or guide wheel 37.

The drive motor 50 shown at the right of FIG. 1 is also illustrated in FIG. 8.

The motor 50 as shown in FIGS. 1 and 8 has a reduction gear unit 51 which drives the shaft 52.

The shaft 52 is carried by the mounting bracket 53 (see FIG. 1) held by the bolts 54 on the end frame 55 of the machine.

The base support 56 is mounted by the bolts 57 upon the platform or plate 58 which in turn is mounted on the channel member 59.

The channel member 59 is in turn mounted upon the base structure 60 (see FIG. 8) which has the reinforcing members 61 and the outturned base support feet 62.

The driving mechanism has a separator or partitioning plate 63.

The drive shaft 52 has a chain drive connection 64 to the sprocket wheel 65 which drives the shaft 66.

The shaft 66 (see FIG. 8) carries the closely spaced sprocket wheels 67 and 68 on the left and 69 and 70 on the right.

This shaft also has sprocket members 71 and 72, which are connected to drive chains 73 (see also FIG. 1) for driving other carrier or sprocket wheels for the chain.

As additional support for the shaft 66, the plate 173 is provided carrying the bearing 74 which plate 173 is mounted by the spacer sleeve and bolt combinations 75 on the partitioning plate 63.

The shaft 66 also has a bearing 76 mounted on the plate 77 which in turn is mounted on the right-hand partitioning plate 63 in FIG. 8.

The main sprocket wheels 67 and 68, 69 and 70 are carried by the hubs 78 and 79, and they have pin adjustments 80 and 81 which ride in the slots 82 and 83 in the shaft 66.

There will be double chains carried by the sprockets 67 and 68 on one side in FIG. 8, and by the sprockets 69 and 70 on the other side with extension members or carrier members 84 and 85 to pick up and carry the sticks.

Figure 15:
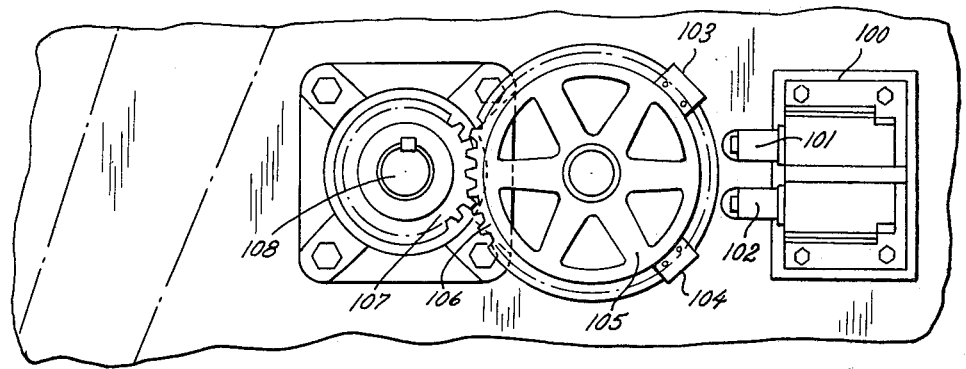
FIG. 15 is a diagrammatic side elevational view indicating the timer mechanism.

At the right end of the shaft 66 in FIG. 8 will be the timer mechanism W which is shown diagrammatically in FIG. 15.

The timer mechanism W (see FIG. 15) has a micro-switch 100 with the contact buttons 101 and 102 which are operated by means of the cams 103 and 104 (see FIG. 15) mounted on the wheel 105.

The wheel 105 has an outer gear 106 which is driven by the pinion 107 from the shaft end 108 of the shaft 66. This timer mechanism will drive continuously for twenty-four seconds during the extrusion and then will provide a rest period or pause of thirty-six seconds while the extrusion is continuing since the machine is in the position indicated in FIGS. 9 and 13.

Figure 14:
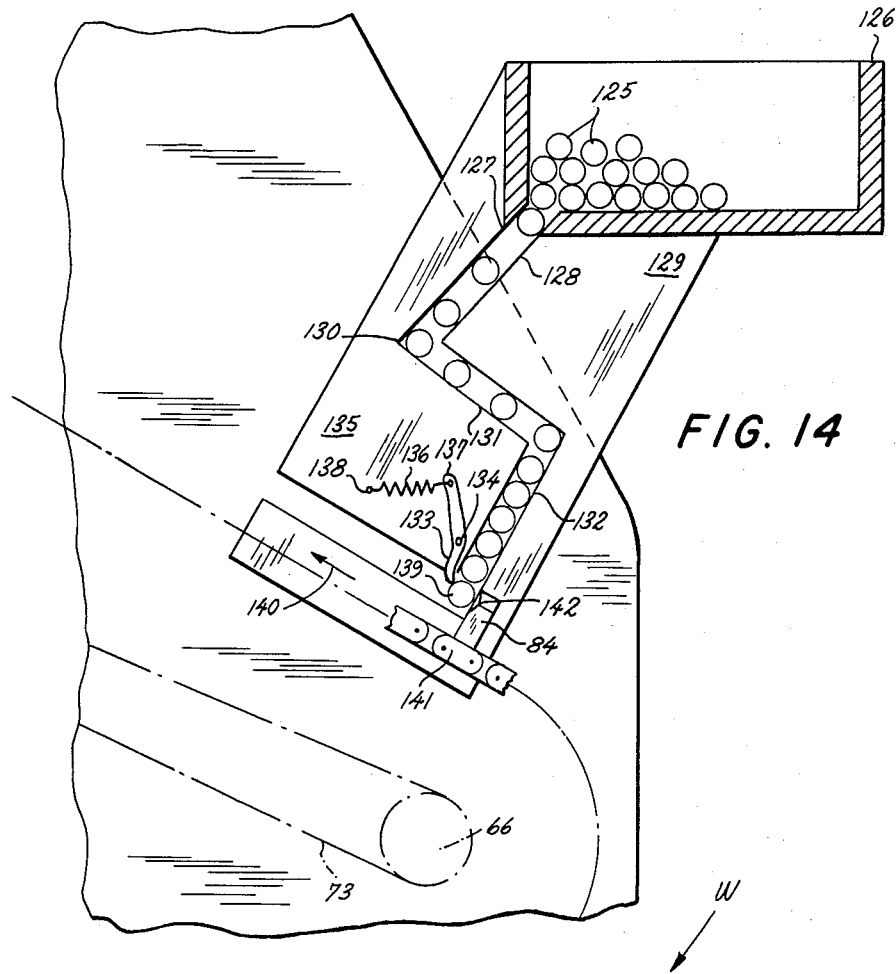
FIG. 14 is a diagrammatic side elevational view illustrating the stick feed to the conveyor chain which is shown upon FIGS. 1 and 2, but upon an enlarged scale as compared to FIGS. 1 and 2.

In the stick feed arrangement shown in FIG. 14, the elongated sticks 125 will be held in a supply or storage box 126 and will be fed through the lower open corner 127 to the feed slot 128 in the side plates 129.

This slot will first extend obliquely to the left as indicated at 130 and then downwardly and obliquely to the right as indicated at 131, and then again downwardly and obliquely to the left as indicated at 132.

The pivoted claw mechanism 133 has a pivot mount at 134 on the side plate 135 (see FIG. 14).

The spring 136, attached to the upper end 137 and fixedly mounted at 138, will draw the lower end of the claw 133 to the right and hold the lowermost stick in position.

As the stick pick-up member 84 comes against the lowermost stick 139, it will release it from the claw 133 and move it upwardly to the left as indicated by the arrow 140.

The lower stick is held by claw 133 prior to its release by pick-up member 84. The sticks 125 are shown spaced in FIG. 14 along sections 130 and 131 of feed slot 128 as they trickle downwardly overcoming the friction in the slot 128. FIG. 14 is a section taken adjacent one partition plate 63.

These stick carrier members 84 will be carried at intervals on the links 141 of the chain, and they will have recesses 142 which carry the ends of the sticks 139.

In FIG. 2 is shown a stick S, which may be the same stick as indicated at 139 in FIG. 14, being carried by the member 84 on the links 141 between the upper and lower guide plates 142 and 143.

The guide plate 143 has a substantial extension to the right as shown at 144 (see FIG. 2) so that the ends of the stick will be picked up and then it extends obliquely upwardly to the left as indicated at 145.

The lower guide plate 143–144–145 is mounted by the screws 146 upon the base member 147, which in turn is mounted on the spacer plate 148.

The upper plate 142 has an entrance lip 149, and it extends parallel and obliquely to the left as indicated at 150 at the left of FIG. 2.

There will be guide plates as indicated in FIG. 2 on each side of the machine to guide the ends of the sticks S when they are being moved through the machine.

The track portion 144 in FIG. 2 is shown horizontally, but it is to be understood that it will be positioned obliquely as indicated in position X in FIG. 1.

In FIG. 3 is shown the end 165 of a stick in dot and dash lines indicating the position between the upper guide plate 142 and the lower guide plate 143.

In FIG. 3, the lower guide plate 143 is shown as mounted by the screws 146 with the spacer 148 extending to the shelf member 166.

The shelf member 166 carries the bolts 167, 168 and 169.

The bolts 168 and 169 carry the guide 170 and 171 for the inside and outside chain structures 172 and 173. The outside flange 174 is mounted by the bolt 175 upon the plate 176 on the frame of the machine.

The four chains which are indicated as I, II, III, IV are used for carrying sticks 165 with the inside chains 173 propelling the sticks by means of the elements 84. The elements 84 are mounted on the inside chains in pairs so as to pick up the sticks as is shown in FIG. 2 at the right thereof.

Referring to FIG. 7, which shows a vertical transverse sectional view on the line 7—7 of FIG. 1, upon an enlarged scale as compared to FIG. 1, the four chains I, II, III and IV are shown as being carried over the sprocket wheels 190, 191, 192 and 193 which form part of the sprocket or drive wheel assembly 36.

These chains are provided with the members 84 and 85 which carry the sticks.

These sprocket wheels 190 and 191 are driven by the shaft 194, and the wheels 192 and 193 are driven by the shaft 195.

The shaft 194 has a bearing 196 mounted upon the plate 197 which in turn is mounted upon the side wall 63.

The shaft 194 carried with the gear 198 is used for synchronizing the sprockets 190 and 191 with adjacent shafts.

The shaft 194 has a terminal bearing 199 which is mounted upon the plate 200.

The plate 200 is carried by the spacer sleeve and stud shaft 201 to mount it upon and to space it from the plate 197.

At the right side of the machine as shown in FIG. 7, the shaft 195 will have a bearing 202 mounted by the plate 203 on the wall or side plate member 63.

This shaft will also carry the gear 204 which meshes with adjacent gears for synchronizing purposes.

The synchronization is accomplished in view of the fact that the sprockets and gears will all be operated in time with one another and so that the entire chain arrangement together with sticks, sprockets and gears will be advanced simultaneously at a rate determined by the drive mechanism.

The shaft 195 continues to the terminal bearing 205 which is mounted upon a plate 206.

The plate 206 is provided with a spacer rod and sleeve 207 by which it is carried on and correctly spaced from the plate 203 and mounted on the wall 63.

The rod members 208 and 209 are mounted at 210 and 211 on the walls 63, and they carry the swinging stick resistance fingers 212 and 213.

These stick resistance fingers are provided with the stops 214 and 215 which limits their movement in the direction from which the sticks come.

The sticks will move toward the observer in FIG. 7.

The tension springs 216 and 217 will tend to draw the fingers 212 and 213 back against the stops 214 and 215 whereas the sticks being carried by the chains I, II, III and IV will contact the fingers 212 and 213 and move them away from the stops 214 and 215 until they have been elevated sufficiently to release the sticks which then are carried by the chains through the positions where they take-up the strands of extruded material as indicated in FIGS. 9 to 13.

Referring to FIG. 1, it will be noted that these static resistant fingers 213 being specifically shown at the section line 7—7 of FIG. 1, contact the ends of the sticks at the maximum height position just after they pass over the assembly 36 and are about to descend to a lower position.

Figure 6:
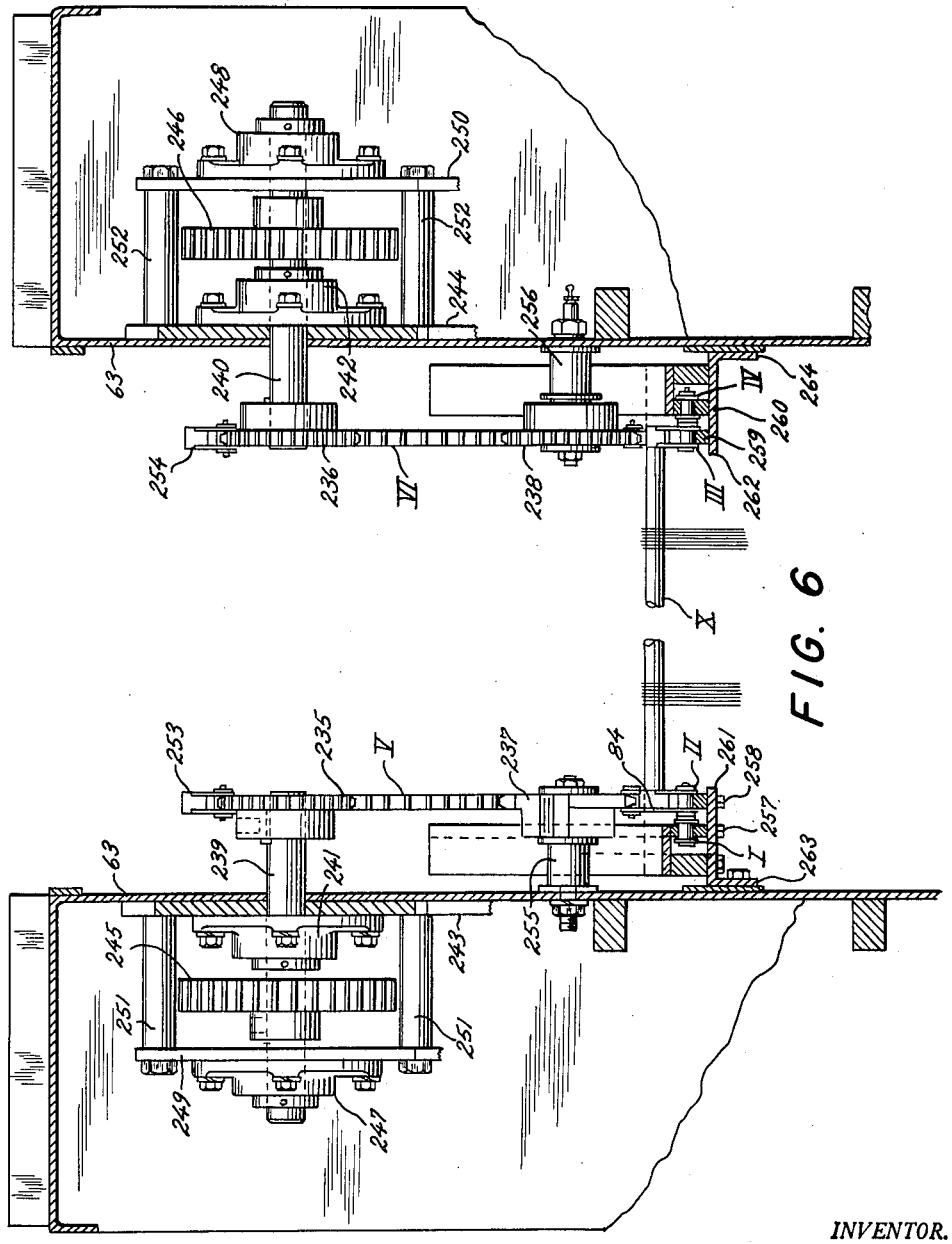
FIG. 6 is a transverse vertical sectional view taken upon the line 6—6 of FIG. 1 showing an intermediate part of the track and chain arrangement, upon an enlarged scale as compared to FIG. 1.

As the sticks move downwardly to the position shown in FIG. 7, at the section line 7—7 of FIG. 1 to the position as shown at section line 6—6 of FIG. 1, they will be held in position by a single chain arrangement on each side illustrated best on FIG. 6.

This chain arrangement has the two side chains V and VI which are carried over the upper sprocket wheels 235 and 236 and the lower sprocket wheels 237 and 238.

The chains V and VI correspond to the inside chains II, III and they will carry the sticks beyond the chains II, III. These chains are of the same construction as chains I, III and are driven in the same manner.

These sprockets 235 and 236 are driven by the shafts 239 and 240 which have bearings 241 and 242 mounted upon the plates 243 and 244, which in turn are mounted upon the side walls or plates 63.

Carried on these shafts 239 and 240 are the drive gears 245 and 246 which mesh with and are driven by the drive gears 198 and 204 shown in FIG. 7.

The ends of the shafts 239 and 240 have terminal bearings, comprising the bearing structures 247 and 248 which are mounted upon the plates 249 and 250 carried by the spacer and rod elements 251 and 252 on the plates 243 and 244.

There will be carried on the chains 235 and 236 the pusher or stick end engaging members 253 and 254.

The stick engaging members 253 and 254 will be mounted on the chains V, VI at intervals to engage and advance the sticks.

The member 254 is indicated at the right of section 6—6 of FIG. 1 which will carry the stick downwardly from position VII and will prevent it from falling out of position during descent as indicated at VIII in FIG. 1.

In position IX at the upper central part of FIG. 1, the elements 253 and 154 will move upwardly after having become dis-engaged from the sticks.

The lower sprocket wheels 237 and 238 are carried by the shafts 255 and 256 which are mounted upon the side walls 63.

The stick shown in the lower position at X in FIG. 6 will be in the position of stick M of FIG. 11 carrying a full load of strands, and it will be transferred from the carrier or pusher members 253 and 254 to the members 84 and 85 of the double chain I, II, III and IV.

It will be noted that the chains I, II, III and IV in FIG. 6 have the guide members or track members 257, 258, 259 and 260 which are positioned on the plates 261 and 262 mounted by the flanges 263 and 264 on the side walls 63.

The chains I, II, III and IV are supported on track members 257, 258, 259 and 260 and guided by the members shown in FIG. 6 overlying chains I and IV. The central portions of the chains will be guided on the tracks 170 and 171 as shown in FIG. 3, which project between the sides of the links forming the chain.

Figure 5:
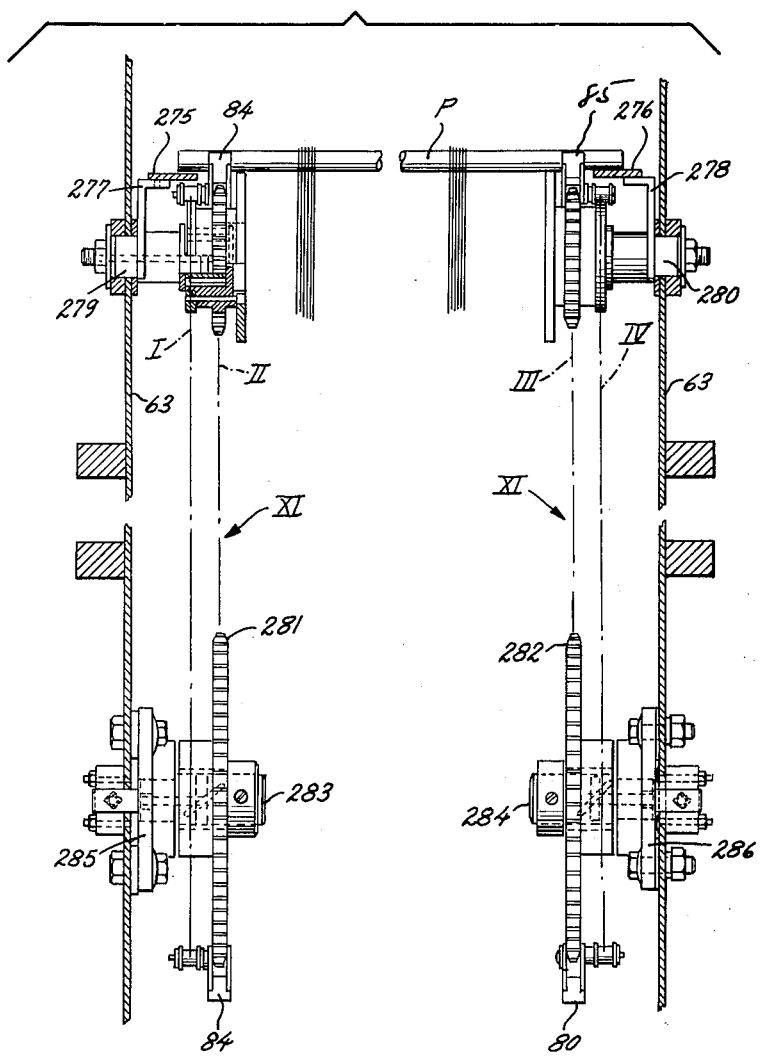
FIG. 5 is a transverse sectional vertical view taken upon the line 5—5 of FIG. 1 and upon an enlarged scale as compared to FIG. 1 showing the track driving mechanism at the outlet side of the machine.

Referring to FIG. 5, which is a vertical section on 5—5 of FIG. 1, the stick will then be moved into the elevated position indicated at P in FIGS. 1 and 5 with the extruded material thereon, and will be carried by the pusher or carrier members 84 and 85.

In this position, the ends of the stick will be carried on the platforms 275 and 276 which in turn are mounted upon the angle members 277 and 278.

The angle members 277 and 278 are mounted on the blocks 279 and 280 which in turn are mounted on the side walls 63.

The double chains I, II, III and IV will leave the stick on the platform strips 275 and 276 and then will move downwardly as indicated at position XI in FIGS. 1 and 5 to the idler sprocket wheels 281 and 282 which are carried on the shafts 283 and 284, supported by the bearings 285 and 286 mounted upon the side walls 63.

The chains I, II, III and IV move over and downwardly at the ends of the platforms 275 and 276 and deposit the sticks thereon.

The pusher or carrier members 84 and 85 will be free of the sticks and then will move horizontally at position XII (see FIG. 1) back to the initial sprocket wheels 67, 68, 69 and 70 of FIG. 8.

In FIG. 4, which is a horizontal downward sectional view, the sticks Q and V are shown as carried by the auxiliary single chain members 300 and 301 which are carried by the sprockets 302 and 303 at one side and 304 and 305 at the other side.

The sticks Q and V are transferred from chain members 84 and 85 to chain members 300 and 301.

The manner in which this transfer is accomplished is shown at the upper left of FIG. 1 since the carrying chains turn downwardly the members 84 and 85 and will release or deposit the sticks Q and V upon the chain members 300 and 301.

These sprockets are respectively carried by the shafts 306, 307, 308 and 309 which are mounted by the bearing members 310, 311, 312 and 313 on the wall members 63.

The shafts 310 and 312 are driven by means of sprockets 314 and 315 which are actuated by the sprocket chains 73 driven from the shaft 66 (see FIG. 1).

The shaft 66 as shown in FIG. 8 will carry the sprocket wheels 71 and 72.

From the arrangement as shown in FIG. 4, the sticks carrying the extruded long goods may then be passed to suitable cutting mechanisms to cut the extruded goods to even length and then to drying chambers.

The chains 73 may be adjusted by the structure 325 in FIG. 1 carrying the idler take-up sprocket 326.

Each idler take-up sprocket 326 has a vertical adjustable slotted member 327 having the screw members 328 and 329 which will clamp the slotted member 327 in a desired adjusted position.

The main chains I, II, III and IV are provided with an adjustment at 330 in FIG. 1 which has a screw adjusting member 331 to move the bearing block 332 laterally upon the adjustment slots 333 (see FIG. 1).

The bearing block 332 is mounted on the frame structure and holds the bearing members 285 and 286.

These adjustment slots will permit a take-up of any looseness in the double chains between the positions XI and XII shown in FIG. 1.

Diagrammatically indicated at the left of FIG. 1 is a cutting arrangement 334 which has double knives at 335.

The double knives 335 may be adjusted upwardly and downwardly by the member 336 and the screw element 337 to cut off the lower ends 338 of the extruded material at the desired length as it hangs down from the sticks V and Q.

This cutting arrangement is supported by the brackets 339 and 340.

The cutting arrangement does not form a part of the present application, and it is not shown in detail.

The cut portions are picked up by the oblique chute 341 and dumped into a receptacle 342 from which they may be removed and recovered.

In operation as illustrated in FIGS. 9 to 13, the sticks are moved from the right to the left with intervals of six seconds between each stick and a space of 15″ between each stick with the dough being extruded at a rate of about 4½″ for every six seconds.

The cutting arrangement which does not form a part of this invention comprises double knives 335 which are rotated or reciprocated and which are driven and supported for adjustment by the screw 337.

It will be noted that the left hand dough extrusion at D and F will always be somewhat behind the right hand dough extrusion at C and E so that the dough extrusion at C and E may be picked up by alternate sticks.

Generally, the operation is initiated by positioning sticks M and P between the extruded material from each side of the dies A and B, in the rest period of thirty-six seconds when the chains I, II, III and IV will be held still by the timer mechanism shown in FIG. 15.

The dies consist of plates and have holes therein through which the macaroni or spaghetti is pressed for extrusion.

If we consider the sticks as constituting cycles, the sticks S, T and U in FIG. 13 will be the first three sticks in the following cycle while the stick R will be the last stick of the preceding cycle, each cycle consisting of four sticks.

The swinging separators in the position of FIG. 13 will hang down directly without swinging to either side to separate the opposite strands C and E from the die head A, at E and F from the die head B.

For example, the strands C and E may have been extruded for twelve seconds giving a length of 9" whereas the strands D and F may have been extruded for eighteen seconds giving a length of 13½".

In the next stage of the operation indicated in FIG. 9, there will be two sticks of the next cycle in position as indicated at P and M directly between the vertically extruded strands C and D, and E and F.

In the next stage indicated in FIG. 10, the sticks M and P will be moved to the left picking up the strands D and F and drawing them around the guide members 32 and 33.

At the same time the sticks R and N will move into and are about to pick up the strands C and E.

The separator members 34 and 35 will swing to the left in FIG. 10 to guide and separate the strands C and D from the die head A, and E and F from the die head B.

Just at this point, the knives H and K will be moving to the right to cut off the ends of the strands F and D which will then fall downwardly over the right side of the sticks M and P.

The operation of FIG. 11 is shown at a slightly later interval with the sticks M and P already having been moved away from their position and with the strands C and E now being cut off by the knives G and J.

It will be noted that in FIG. 11, the strands D and E have again been started and about 4½" has been extruded during the six seconds interval between FIG. 10 and FIG. 11.

The swinging separators 34 and 35 will be at their maximum left position to keep the incoming new strands D and F from becoming mixed with the ends of the strands D and C which have been just cut off by the knives G and J.

The sticks are advanced in cycles and the one cycle will include the sticks N, M and R which are the last three sticks of the four stick cycle will then pass to the left, and a new cycle consisting of the first stick S of the next four sticks is being moved in position.

In the next position in FIG. 12, the last two sticks of the preceding four stick cycle are moving to the left whereas the first two sticks S and T of the next four stick cycle are moving to their proper positions.

In the stage of FIG. 12 about 9" of the strands D and F will have been extruded in the twelve second interval while 4½" of the strands C and E have been extruded in a six second interval.

In FIG. 13, the three sticks S, T and U of the next four stick cycle will be in position with the strand F being 13½" in length and having extruded for eighteen seconds, and the strands C and E being 9" in length and having extruded for twelve seconds.

The last stick R of the preceding four stick cycle is at the extreme left of the FIG. 13.

The sticks are fed at suitable intervals and regulated by the pusher and engaging members 84 and 85 as indicated in FIG. 14, and the timer mechanism having the elements 103 and 104 will alternately contact the microswitch elements 101 and 102 to run the chain for twenty-four seconds and to cause a pause for thirty-six seconds, which will take place between FIGS. 13 and 9 as the extrusion is taking place to the proper length.

The microswitch arrangement as shown in FIG. 15 will be actuated by the contacts 103 and 104 which will touch the actuator elements as they pass them. These switches have circuit connections to the driving motor shown in FIG. 8 and at 50 in FIG. 1.

This will take place after the first and third sticks P and M or S and U of the next four stick cycle have been placed in position as indicated in FIGS. 9 and 13.

The sticks are carried by the members 84 and 85 up the grade as indicated at the right of FIG. 1, and they will be held in position by the auxiliary chain arrangement indicated in FIG. 6 when they pass downwardly in postion VIII in FIG. 1.

They will then be carried upwardly and onto the chain arrangement 301 and 302 as indicated at the upper left of FIG. 1 and in greater detail in FIG. 4.

The applicant thereby has devised a high speed method of applying extruded strands to stick carriers in which a substantially continuous operation is obtained without involving any manual intervention and with the sticks taking up their amount of extruded material substantially continuously.

As many changes could be made in the above long goods machine, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. In an apparatus for producing inverted U-loops of spaghetti products having a plurality of separated die means for continuously extruding parallel rows of paste strands, means to cut a row of extruded paste strands alternately on opposite sides of each of said die means, an endless conveyer for presenting carrying sticks to the said extruded strands, holding means for holding the ends of the sticks while they are being carried by the conveyor against either upward or downward motion, means coacting with said conveyor to lower each stick to a lowermost position after it is advanced past said holding means whereby two successive sticks advanced to said lowermost position will each pick up a row of strands extruded from one of said die means while the next two sticks will each pick up a row of strands extruded from the other die means during their movement and vertically obliquely oscillating guide means to guide said strands when forming said loops.

2. The apparatus of claim 1, said holding means consisting of upper and lower guide plates extending alongside of and above and below the conveyor and parallel thereto.

3. The apparatus of claim 1, said conveyor having parallel inside and outside conveyor chains on each side of the apparatus, the inside chains having means to engage the rear side of the ends of the sticks and pick up the ends of the sticks and the outside chains being guide chains and said stick ends projecting over said guide chains.

4. The apparatus of claim 1, resistance fingers positioned to act on the ends of the sticks to resist their forward movement and spring means to permit said sticks to be pressed against and then released by said fingers.

5. In an apparatus for producing elongated spaghetti and macaroni paste strands having at least two parallel elongated dies each extruding a plurality of parallel rows of paste strands, oscillating cutters to cut such strands actuated to contact and slide beneath the dies, a double chain conveyer having two parallel chains at each side, means to cause the conveyor to operate at intervals to move sticks transversely to pick up the strands to permit a substantially complete extrusion of the strands at one side of the elongated dies and means for moving the sticks forward as soon as the strands have been extruded their full length and guide means to hold both the upper and lower sides of the ends of the sticks.

References Cited by the Examiner

UNITED STATES PATENTS

| 1,217,891 | 2/1917 | Mueller | 107—54 |
| 1,257,966 | 3/1918 | Barducci | 107—7(8) |
| 1,286,029 | 11/1918 | Kraybill | 107—54 |
| 1,627,297 | 5/1927 | Surico | 107—7.8 X |
| 2,223,352 | 12/1940 | Francisci | 107—7.8 |
| 2,481,275 | 9/1949 | Ambrette | 107—7(8) |
| 2,687,101 | 8/1954 | Francisci | 107—7.8 |
| 2,800,088 | 7/1957 | Leibundgut | 107—14.6 |
| 2,863,404 | 12/1958 | Ambrette et al. | 107—14.6 |

WALTER A. SCHEEL, *Primary Examiner.*

J. D. SEERS, D. J. STOCKING, CHARLES A. WILLMUTH, ROBERT E. PULFREY, *Examiners.*